US012741827B2

(12) United States Patent
Kinoshita

(10) Patent No.: US 12,741,827 B2
(45) Date of Patent: Sep. 22, 2026

(54) SUBSTRATE HOLDING HAND AND SUBSTRATE CONVEYOR ROBOT

(71) Applicant: KAWASAKI JUKOGYO KABUSHIKI KAISHA, Kobe (JP)

(72) Inventor: Shinya Kinoshita, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 179 days.

(21) Appl. No.: 18/727,144

(22) PCT Filed: Dec. 21, 2022

(86) PCT No.: PCT/JP2022/047166
§ 371 (c)(1),
(2) Date: Jul. 8, 2024

(87) PCT Pub. No.: WO2023/145324
PCT Pub. Date: Aug. 3, 2023

(65) Prior Publication Data

US 2025/0074719 A1 Mar. 6, 2025

(30) Foreign Application Priority Data

Jan. 25, 2022 (JP) ................................ 2022-009264

(51) Int. Cl.
*B65G 47/90* (2006.01)
*B25J 9/10* (2006.01)

(52) U.S. Cl.
CPC ............. *B65G 47/90* (2013.01); *B25J 9/106* (2013.01)

(58) Field of Classification Search
CPC ....... B25J 9/106; B65G 47/90; H10P 72/3412
See application file for complete search history.

(56) References Cited

U.S. PATENT DOCUMENTS 6,216,883 B1* 4/2001 Kobayashi .......... H10P 72/7602 211/41.18
9,245,784 B2* 1/2016 Hashimoto ......... H10P 72/3302
10,297,482 B2 5/2019 Fukushima et al.
11,414,278 B2* 8/2022 Kasahara ............... B65G 47/90
11,817,342 B2* 11/2023 Pan ..................... H10P 72/7602
2001/0048867 A1* 12/2001 Lebar .................. H10P 72/0464 414/217
2002/0119033 A1* 8/2002 Brown ................ H10P 72/3404 414/405
2005/0135905 A1* 6/2005 Moriya ............... H10P 72/3212 414/222.01
2010/0290886 A1 11/2010 Hashimoto et al.
2014/0210224 A1* 7/2014 Hashimoto ............. H10P 72/30 901/30
2022/0093444 A1* 3/2022 Kuribayashi ....... H10P 72/7602

(Continued)

FOREIGN PATENT DOCUMENTS

JP 2006-313865 A 11/2006
JP 6313972 B2 4/2018

(Continued)

*Primary Examiner* — Saul Rodriguez
*Assistant Examiner* — Brendan P Tighe
(74) *Attorney, Agent, or Firm* — Oliff PLC

(57) ABSTRACT

A substrate-holding hand includes a plurality of blades, a linkage for supporting the plurality of blades, and a force applier arranged for applying a force to the linkage in a direction that increases a pitch between the blades.

8 Claims, 10 Drawing Sheets

(56) References Cited

U.S. PATENT DOCUMENTS

| | | | | |
|---|---|---|---|---|
| 2022/0250255 | A1* | 8/2022 | Shimizu | B25J 15/0052 |
| 2024/0420977 | A1* | 12/2024 | Ma | H10P 72/127 |

FOREIGN PATENT DOCUMENTS

| | | | |
|---|---|---|---|
| JP | 2018-161729 | A | 10/2018 |
| JP | 2021-019145 | A | 2/2021 |
| WO | 2013/021645 | A1 | 2/2013 |

* cited by examiner

SUBSTRATE HOLDING HAND AND SUBSTRATE CONVEYOR ROBOT

TECHNICAL FIELD

The present disclosure relates to a substrate-holding hand and a substrate-conveying robot.

BACKGROUND ART

Substrate-conveying robots including a substrate-holding hand are known in the art. Japanese Patent Laid-Open Publication No. JP2006-313865 discloses a substrate-holding apparatus including a plurality of blades for holding substrates, and a pitch-changing mechanism for changing a pitch between the blades. The pitch-changing mechanism in Japanese Patent Laid-Open Publication No. JP2006-313865 includes blade attachment plates attached to base ends of the plurality of blades. The blade attachment plates are attached to a pitch conversion cylinder. The pitch conversion cylinder moves the blade attachment plates frontward and backward to change the pitch between the blades. The pitch conversion cylinder is pneumatically driven. The pitch conversion cylinder changes each pitch between the blades between two levels of wide and narrow pitches.

PRIOR ART

Patent Document

Patent Document 1: Japanese Patent Laid-Open Publication No. JP2006-313865

SUMMARY OF THE INVENTION

In the substrate-holding apparatus in Japanese Patent Laid-Open Publication No. JP2006-313865, the pitch between the plurality of blades is changed by moving the blade attachment plates upward and downward by using the pitch conversion cylinder. Here, the pitch conversion cylinder may be deactivated and not be driven in a case of maintenance of the substrate-holding apparatus or other work activities. In this case, because air is not supplied to the pitch conversion cylinder, the blades are moved downward by own weights of the blades so that the pitch between the blades become narrow. To address this, it is desired to keep the pitches between the blades even when a driving force is not applied to the blades for holding the substrate.

The present disclosure is intended to solve the above problem, and to provide a substrate-holding hand and a substrate-conveying robot capable of keeping a pitch between blades even when a driving force is not applied to the blades for holding substrates.

A substrate-holding hand according to a first aspect of the present disclosure includes a plurality of blades for supporting substrates and stacked with the plurality of blades being spaced away from each other; a linkage for supporting the plurality of blades to change a pitch between the blades; and a force applier arranged separately from a driver for driving the linkage for applying a force to the linkage in a direction that increases the pitch between the blades.

In the substrate-holding hand according to the first aspect of the present disclosure, as discussed above, the force applier is provided to be arranged separately from the driver for driving the linkage for applying a force to the linkage in a direction that increases the pitch between the blades. According to this configuration, because the force applier applies a force to the linkage in the direction that increases the pitch between the blades, it is possible to keep a pitch between blades even when a driving force is not applied to the blades for holding substrates.

A substrate-conveying robot according to a second aspect of the present disclosure includes a robot arm; and a substrate-holding hand arranged in a distal end part of the robot arm, wherein the substrate-holding hand includes a plurality of blades for supporting substrates and stacked with the plurality of blades being spaced away from each other, a linkage for supporting the plurality of blades to change a pitch between the blades, and a force applier arranged separately from a driver for driving the linkage for applying a force to the linkage in a direction that increases the pitch between the blades.

In the substrate-conveying robot according to the second aspect of the present disclosure, as discussed above, the force applier is provided to be arranged separately from the driver for driving the linkage for applying a force to the linkage in a direction that increases the pitch between the blades. Accordingly, because the force applier applies a force to the linkage in the direction that increases the pitch between the blades, it is possible to provide a substrate-conveying robot capable of keeping a pitch between blades even when a driving force is not applied to the blades for holding substrates.

According to this disclosure, it is possible to keep a pitch between blades even when a driving force is not applied to the blades for holding substrates.

MODES FOR CARRYING OUT THE INVENTION

Embodiments embodying the present disclosure will be described with reference to the drawings.

First Embodiment (Configuration of Substrate-Conveying Robot)

Figure 1:
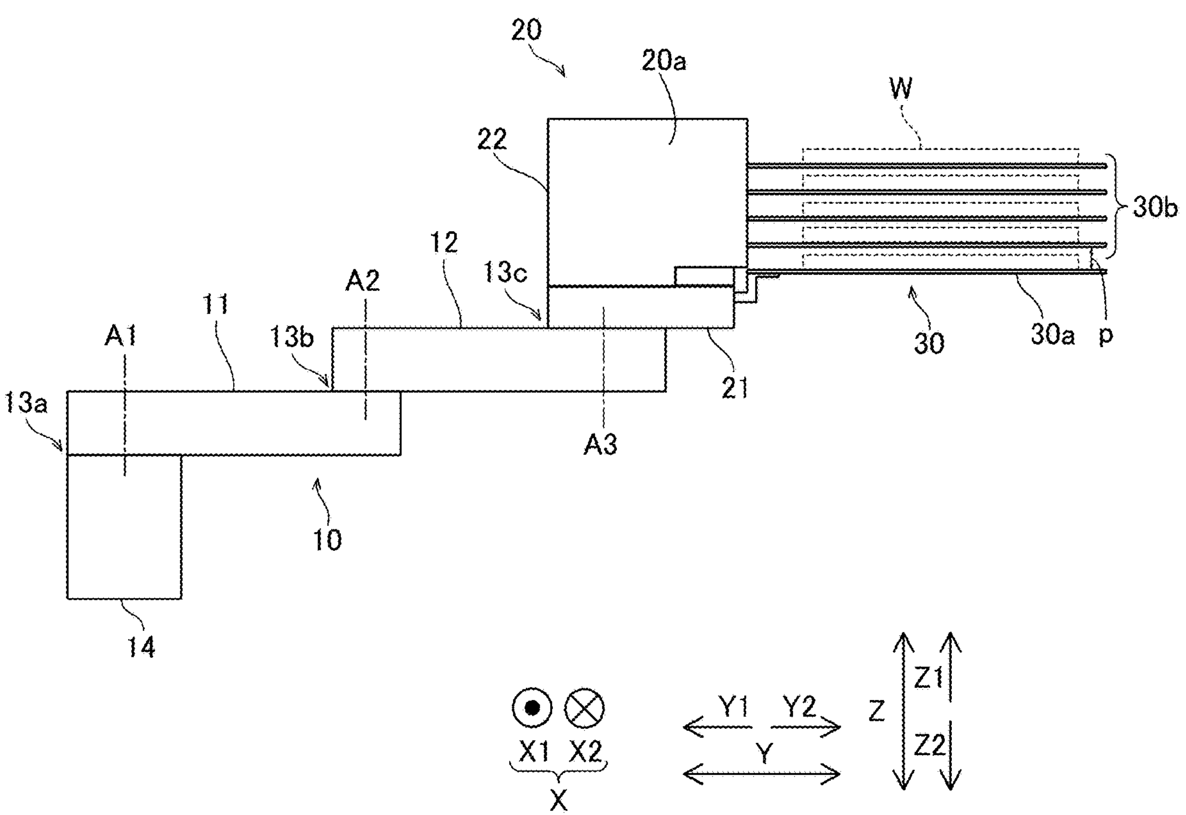
FIG. 1 is a diagram showing a configuration of a substrate-conveying robot according to a first embodiment.

The following description describes a configuration of a substrate-conveying robot 100 according to a first embodiment with reference to FIGS. 1 to 9. As shown in FIG. 1, the substrate-conveying robot 100 includes a robot arm 10, and a substrate-holding hand 20.

In this specification, the upward/downward direction is defined as a Z direction. An upper side is defined a Z1 side, and a lower side is defined as a Z2 side. A direction orthogonal to the Z direction is defined as an X direction. One side in the X direction is defined as an X1 side, and another side is defined as an X2 side. A direction orthogonal to the Z direction and the X direction is defined as a Y direction. One side in the Y direction is defined as an Y1 side, and another side is defined as an Y2 side.

The robot arm 10 is a horizontal multi-joint robot arm. The robot arm 10 includes a first arm 11 and a second arm 12. One end of the first arm 11 is connected to a base 14 through a first joint 13*a*. One end of the second arm 12 is connected to another end of the first arm 11 through a second joint 13*b*. The substrate-holding hand 20 is connected to another end of the second arm 12 through a third joint 13*c*. Drive mechanisms including servo motors, which are rotational driving sources, rotational position sensors for detecting rotational positions of output shafts of the servo motors, and power transmission mechanisms that transmit outputs of the servo motors to the joints are arranged in the joints of the first joint 13*a*, the second joint 13*b* and the third joint 13*c*. The first joint 13*a*, the second joint 13*b* and the third joint 13*c* rotate about a first rotation axis A1, a second rotation axis A2, and a third rotation axis A3, respectively, extending in a vertical direction.

(Configuration of Substrate-Holding Hand)

Figure 2:
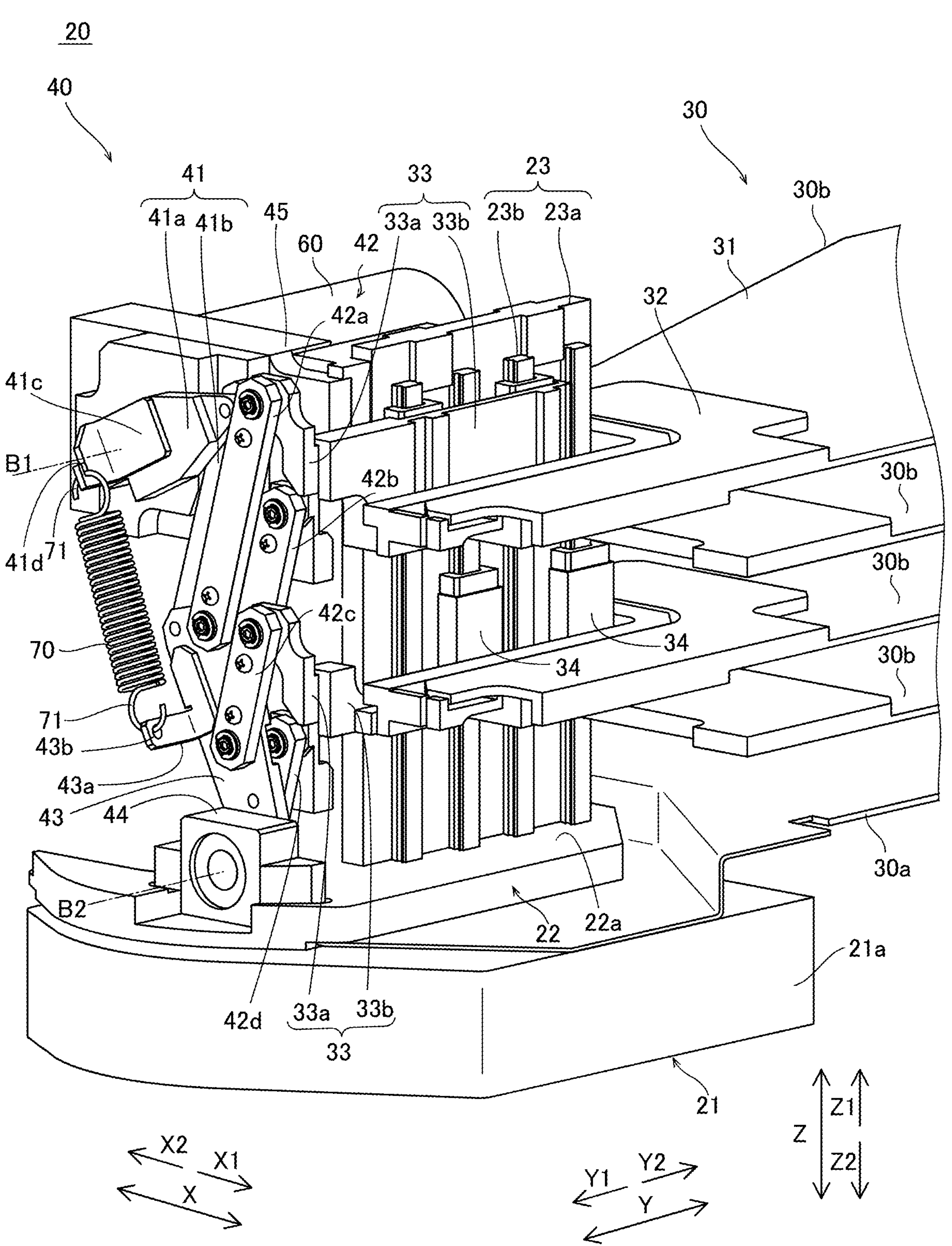
FIG. 2 is a perspective view showing a linkage with a pitch between blades being large.
Figure 3:
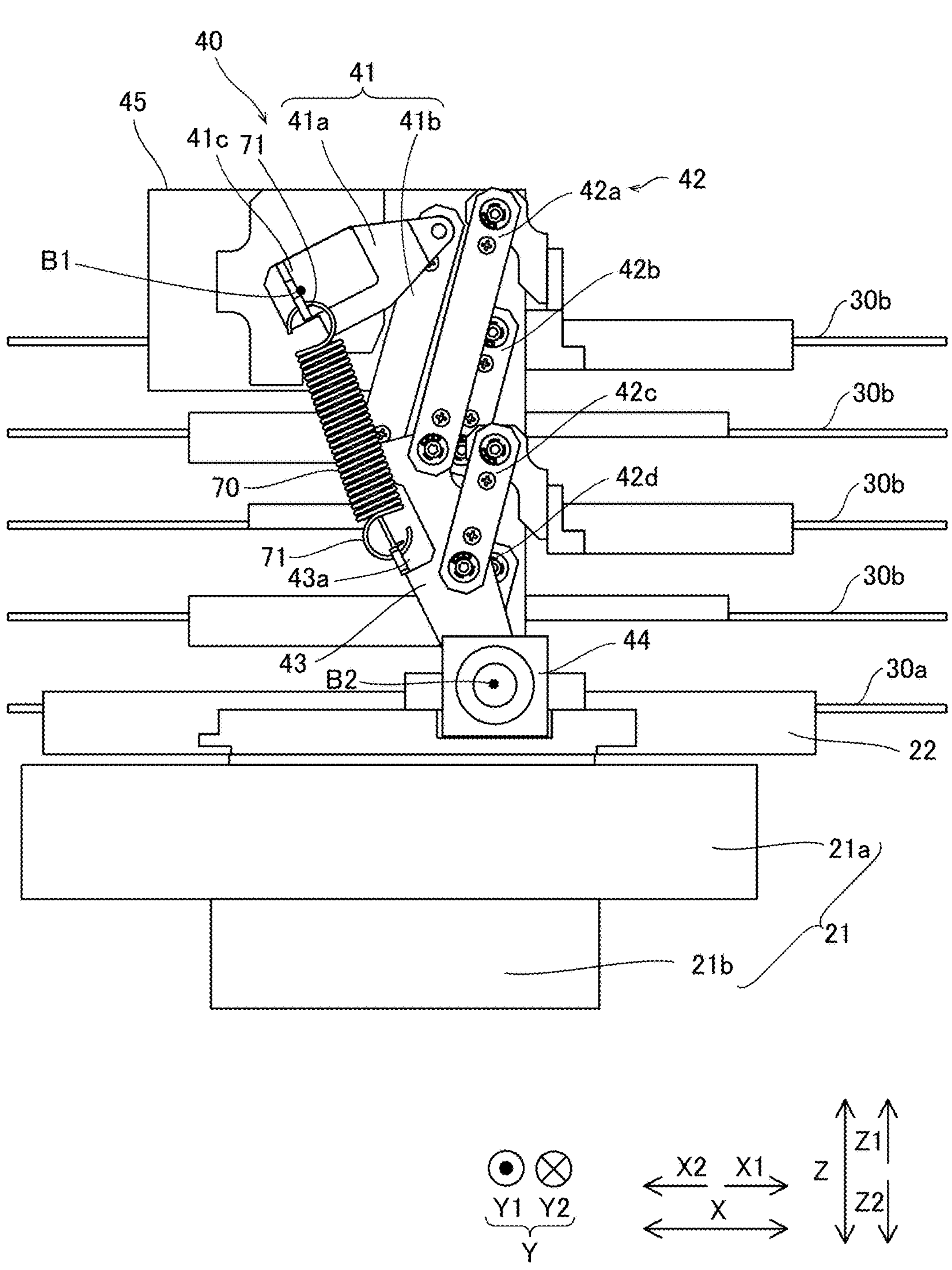
FIG. 3 is a view showing the linkage with the pitch between the blades being large as viewed in a Y1 side.
Figure 4:
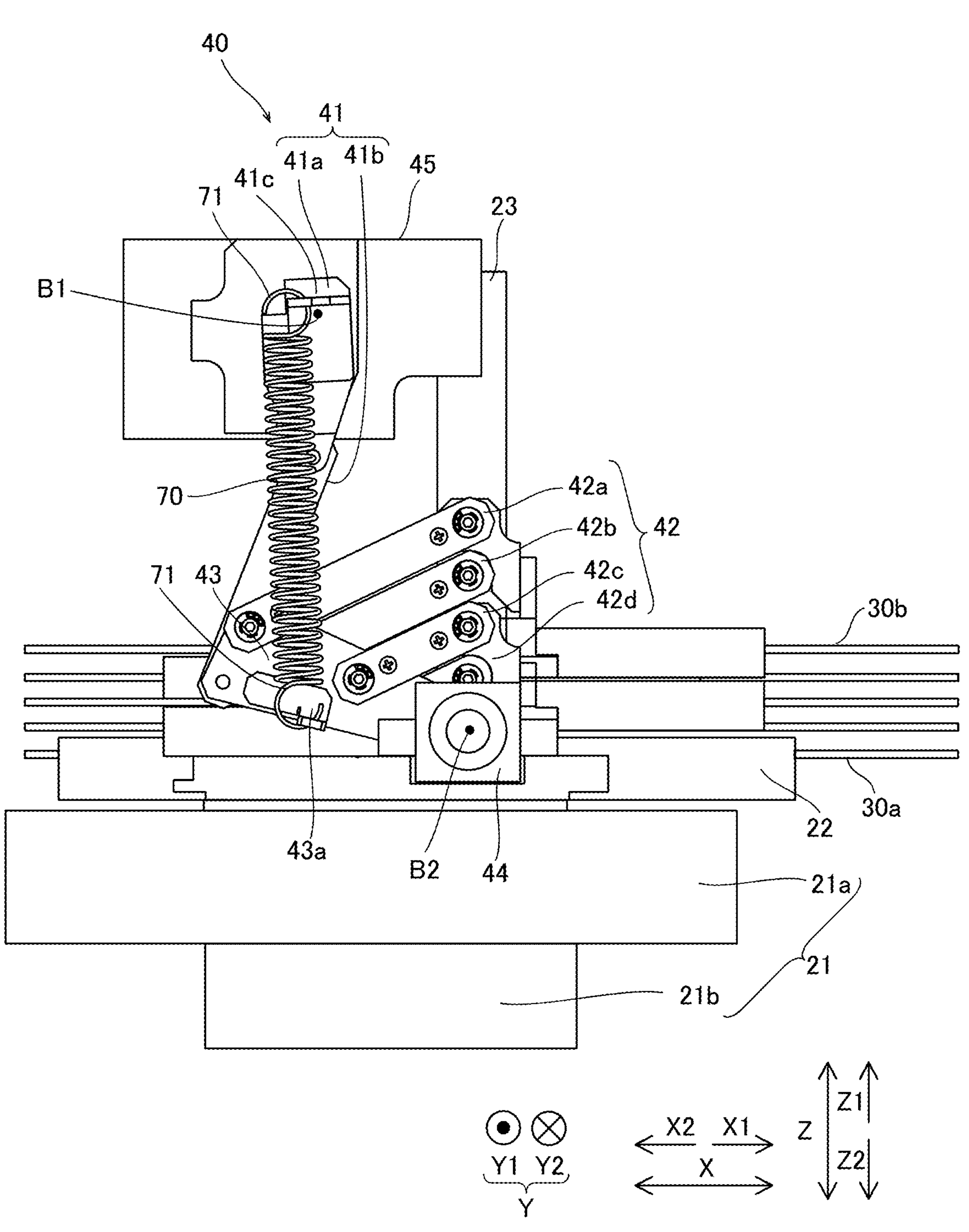
FIG. 4 is a view showing the linkage with the pitch between the blades being small as viewed in the Y1 side.
Figure 6:
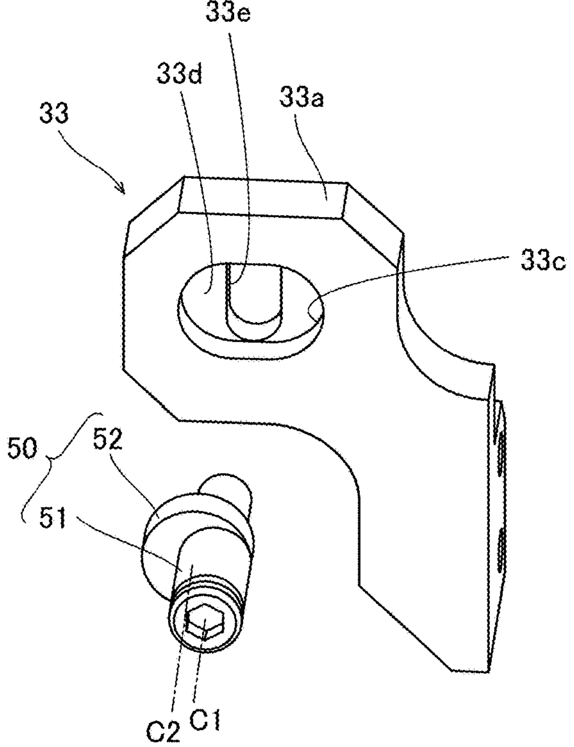
FIG. 6 is a view showing the connection part of the blade and an eccentric element.

As shown in FIG. 2, the substrate-holding hand 20 includes blades 30, a linkage 40 eccentric bolts 50 shown in FIG. 6, a driver 60 and a biaser 70. In FIGS. 2, 3 and 4, a cover 20*a* shown in FIG. 1, which covers the linkage 40, the eccentric bolts 50, the driver 60 and the biaser 70, is omitted.

The substrate-holding hand 20 is arranged in a distal end part of the robot arm 10, as shown in FIG. 1. As described above, the substrate-holding hand 20 is connected to another end of the second arm 12.

As shown in FIG. 1, the substrate-holding hand 20 includes a first substrate-holding hand 21 and a second substrate-holding hand 22. The second substrate-holding hand 22 is arranged above the first substrate-holding hand 21, and operates independently of the first substrate-holding hand 21. Specifically, the first substrate-holding hand 21 is connected to another end of the second arm 12. The second substrate-holding hand 22 is connected to the first substrate-holding hand 21. The second substrate-holding hand 22 is rotated about the third rotation axis A3.

In the first embodiment, a plurality of blades are provided as the blades 30 as shown in FIG. 1. The plurality of blades 30 for supporting substrates W are stacked with the plurality of blades being spaced away from each other. Each of a plurality of blades 30 include a blade body 31, a support 32 and a connection part 33 as shown in FIG. 2. The blade body 31 supports the substrate W. The blade body 31 has a Y shape having two forked ends. The blade body 31 has a thin plate shape. The shape of the blade body 31 is not limited to the Y-shape and the thin-plate shape. The support 32 supports the blade body 31. The support 32 is arranged in a proximal end part of the blade body 31. The connection part 33 connects the support 32 to a second link 42, which will be described later. The connection part 33 includes a first connection part 33*a* connected to the second link 42, and a second connection part 33*b* connecting the first connection part 33*a* to the support 32. That is, the blade body 31, the support 32, the second connection part 33*b*, the first connection part 33*a*, and the second link 42 are connected in this order to each other.

In the first embodiment, the blades 30 includes a first blade 30*a* and second blades 30*b* as shown in FIG. 1. The first blade 30*a* is provided to the first substrate-holding hand 21. The first blade 30*a* is fixed to the first substrate-holding hand 21. One blade is provided as the first blade 30*a*. The second blades 30*b* are provided to the second substrate-holding hand 22. In the second blades 30*b*, as shown in FIGS. 3 and 4, a pitch p between the second blades 30*b* is changed by the linkage 40. Four blades are provided as the second blades 30*b*, for example. The configurations of the plurality of second blades 30*b* are similar to each other. The pitch p between the second blades 30*b* refers to a gap between the second blades 30*b* adjacent to each other in the Z direction.

As shown in FIG. 3, the first substrate-holding hand 21 includes a base part 21*a* and a connection part 21*b*. The first blade 30*a* is attached to the base part 21*a*. The connection part 21*b* is connected to the second arm 12.

As shown in FIG. 2, the second substrate-holding hand 22 includes a base part 22*a*, a guide 23 and the linkage 40. The base part 22*a* is connected to the base part 21*a* of the first substrate-holding hand 21. The guide 23 is attached to the base part 22*a*. The guide 23 guides movements of the second blades 30*b* in the Z direction when the pitch p between the second blades 30*b* is changed by the linkage 40. Specifically, the guide 23 includes a support stand 23*a* and guide rails 23*b*. The support stand 23*a* has a plate shape extending in the Z direction. A plurality of guide rails are provided as the guide rails 23*b* having a rod shape extending in the Z direction. Specifically, four guide rails 23*b* are arranged on each of both sides, which are the X1 and X2 sides, of the support stand 23*a*.

The second connection part 33*b* of the second blade 30*b* that is positioned at a first level from a top side is guided by the guide rails 23*b*. The second connection part 33*b* of the second blade 30*b* that is positioned at a second level from the top side is similarly guided by the guide rails 23*b*. The second blade 30*b* that is positioned at a third level from the top side includes guided parts 34 to be guided by the guide rails 23*b*. The second blade 30*b* that is positioned at a fourth level from the top side also includes guided parts 34 to be guided by the guide rails 23*b*.

In the first embodiment, the linkage 40 supports the plurality of blades 30, and changes the pitch p between blades 30. Specifically, the linkage 40 supports the second blades 30*b*, and changes the pitch p between the second blades 30*b*. A pitch p between the second blades 30*b* that is positioned at the bottom level and the first blade 30*a* is correspondingly changed by changing the pitch p between the second blades 30*b* by the linkage 40. The linkage 40 converts rotation of the driver 60 into movement of the blades 30 in the Z direction.

In the first embodiment, the linkage 40 includes a first link 41, second links 42, and a third link 43. The first link 41 is connected to the driver 60. Each of a plurality of second links as the second links 42 is connected to corresponding one of the blades 30, and the third links 43 connect the plurality of second links 42 to each other. The first link 41, the second links 42, and the third link 43 are formed of a metal, and have plate shapes. The first link 41, the second link 42 and the third link 43 may be formed of materials other than metals, and may have shapes other than plate shapes.

Specifically, the first link 41 includes a first part 41*a* and a second part 41*b*. One end of the first part 41*a* is connected to a driving shaft of the driver 60. The first part 41*a* is rotated by a driving force of the driver 60. One end of the first part 41*a* is rotated about an axis B1 extending in the Y direction. Another end of the first part 41*a* is connected to one end of the second part 41*b*. Another end of the second part 41*b* is connected to one end of the third link 43. Also, the first link 41 and the driver 60 are supported by a support 45 connected to the support stand 23*a* of the guide 23.

One end of each second link 42 is connected to the third link 43. Another end of each second link 42 is connected to corresponding one of the second blades 30*b*. Four second links as the second links 42 are correspondingly provided to the four second blades 30*b*. A second link 42*a* and a second link 42*c*, which are connected the first second blade 30*b* and the third second blade 30*b*, respectively, from the top side in the four second blades 30*b*, are connected to the Y1 side of the third link 43. A second link 42*b* and a second link 42*d*, which are connected the second second blade 30*b* and the fourth second blade 30*b*, respectively, from the top side, are connected to the Y2 side of the third link 43. A relationship between lengths of the second link 42*a*, the second link 42*b*, the second link 42*c* and the second link 42*d* is represented by the length of the second link 42*a*>the length of the second link 42*b*>the length of the second link 42*c*>the length of the second link 42*d*.

One end of the third link 43 is connected to another end of the second part 41*b* of the first link 41. Another end of the third link 43 is connected to the support 44 arranged on the base part 22*a*. Another end of the third link 43 is rotated about an axis B2 extending in the Y direction.

The driver 60 drives the linkage 40. As described above, the driver 60 is connected to the first part 41*a* of the first link 41, and rotates the one end of the first part 41*a* about the axis B1. The driver 60 is an actuator that rotates the first link 41. For example, the driver 60 is a servo motor.

(Biaser)

In the first embodiment, the biaser 70 is provided separately from the driver 60, which drives the linkage 40. The biaser 70 applies a force to the linkage 40 in a direction that increases the pitch p between the blades 30. The biaser 70 biases the linkage 40 in the direction that increases the pitch p between the blades 30.

In the first embodiment, the biaser 70 is connected to the first link 41 and the third link 43. The biaser 70 includes a pulling coil spring that applies a pulling force to the first link 41 to rotate the first link in the direction that increases the pitch p between the blades 30. Specifically, the biaser 70 includes circular hooks 71 on its both ends. The first link 41 includes a biaser attachment part 41*c*. The third link 43 includes a biaser attachment part 43*a*. The biaser attachment part 41*c* and the biaser attachment part 43*a* have L shapes, and protrude toward the Y1 side. The biaser attachment part 41*c* and the biaser attachment part 43*a* have a notch 41*d* and a hole 43*b*, respectively. The hooks 71 on the both ends of the biaser 70 are attached to the notch 41*d* of the biaser attachment part 41*c* and the hole 43*b* of the biaser attachment part 43*a*. Only one biaser is provided as the biaser 70.

In the first embodiment, the pitch p between the second blades 30*b* is changed by the driver 60 with a biasing force being applied against own weights of the second blades 30*b* by the biaser 70. Also, balance is achieved between the force that is applied by the biaser 70 and the own weights of the plurality of second blades 30*b* without a driving force of the driver 60. If the plurality of second blades 30*b* are not attached to the substrate-holding hand 20, an angle formed between the first part 41*a* and the third link 43 of the linkage 40 is maximized by the biasing force of the biaser 70. When the plurality of second blades 30*b* are attached to the substrate-holding hand 20, the angle formed between the first part 41*a* and the third link 43 of the linkage 40 is reduced by a certain amount of degrees. Accordingly, balance is achieved between the force that is applied by the biaser 70 and the own weights of the plurality of second blades 30*b*. As a result, operators can move the second blades 30*b* in the Z direction with a relatively small force under a condition in which the driving force of the driver 60 is not applied.

Also, the pitch p between the second blades 30*b* is changed by the driver 60 with balance being achieved between the biasing force of the biaser 70 and the own weights of the plurality of second blades 30*b*. As shown in FIG. 3, the pitch p between the second blades 30*b* is large under a condition in which balance is achieved between the biasing force of the biaser 70 and the own weights of the plurality of second blades 30*b*. As shown in FIG. 4, the pitch p between the second blades 30*b* is reduced by rotating the first part 41*a* of the first link 41 counterclockwise by using the driver 60. Because a rotation amount of the driver 60 can be continuously varied, the pitch p between the second blades 30*b* can be continuously varied.

(Eccentric Element)

Figure 5:
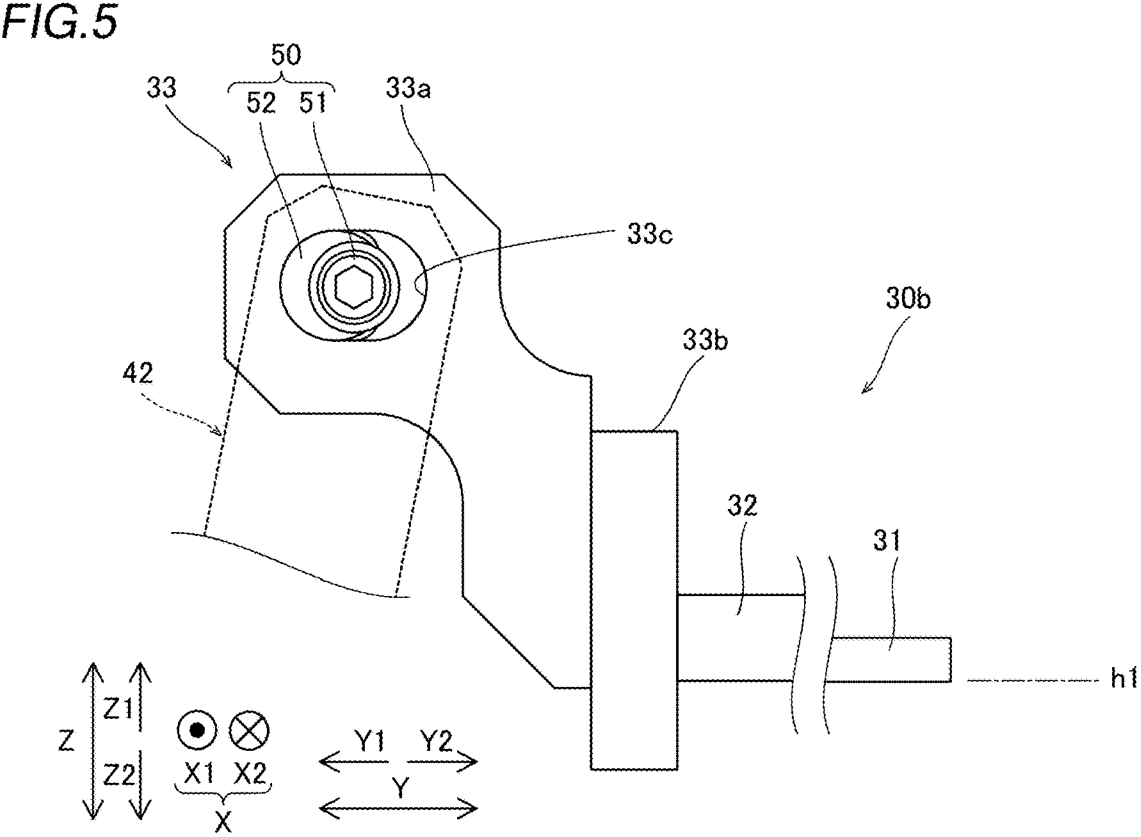
FIG. 5 is a view showing a connection part of the blade.

In the first embodiment, eccentric bolts 50 connect the plurality of blades 30 to the linkage 40, as shown in FIG. 5. As shown in FIG. 6, the eccentric bolt 50 includes a shaft 51, and a disk-shaped flange 52 eccentrically arranged from a rotation center axis C1 of the shaft 51. The eccentric bolt 50 is an element that has the rotation center axis C1 of the shaft 51 and a rotation center axis C2 of the disk-shaped flange 52 offset from the rotation center axis C1. The eccentric bolt 50 serves as an element for fine adjustment of the height position of the blade 30 in the Z direction.

In the first embodiment, each of the plurality of second blades 30*b* is connected to corresponding one of the plurality of second links 42 by corresponding one of the eccentric bolts 50. The second blade 30*b* has a hole 33*c*. The hole 33*c* is arranged in the first connection part 33*a* of the connection part 33. The eccentric bolt 50 is inserted into the hole 33*c*. The second blade 30*b* is moved upward and downward by rotating the eccentric bolt 50 inserted in the hole 33*c* with the flange 52 being in contact with an interior side surface of the hole 33*c*. This arrangement allows fine adjustment of the height position of the second blade 30*b*. In addition, a bottom part 33*d* is arranged in the hole 33*c*. A hole 33*e* is arranged in the bottom part 33*d*. The flange 52 is in contact with the bottom part 33*d* with the eccentric bolt 50 being inserted into the hole 33*e*.

Figure 7:
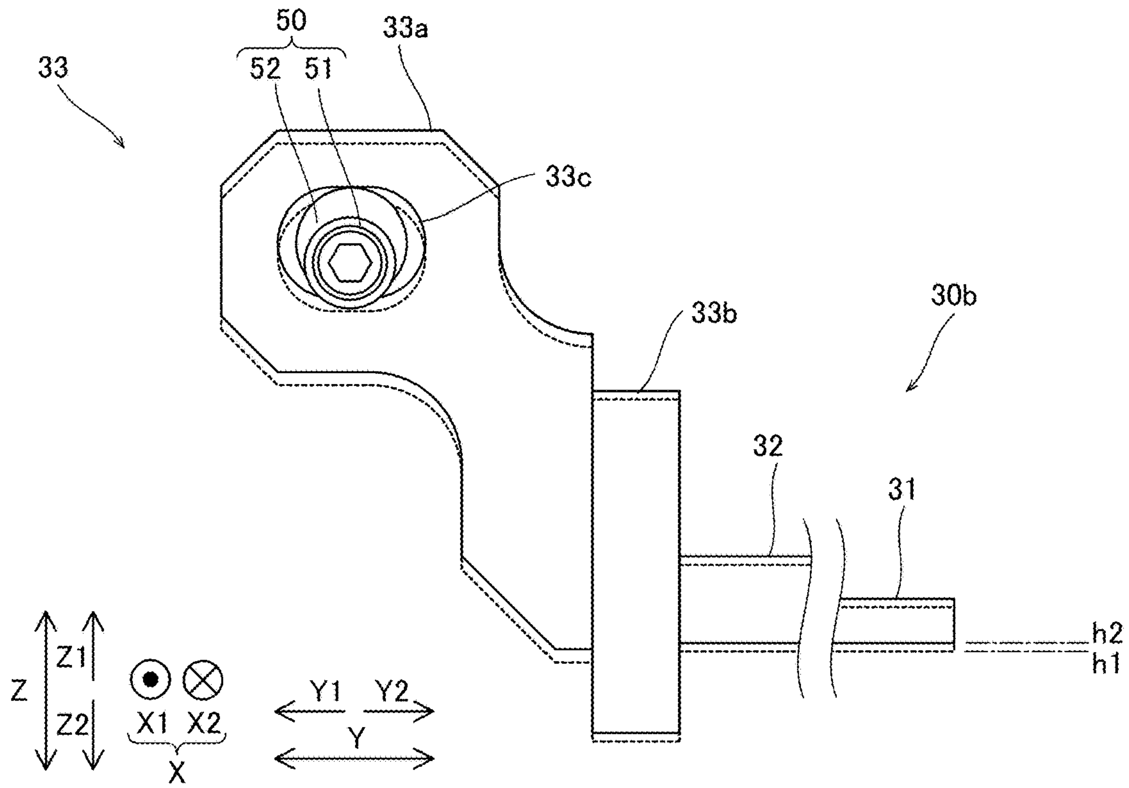
FIG. 7 is a view showing the blade whose height position is adjusted upward by fine adjustment.
Figure 8:
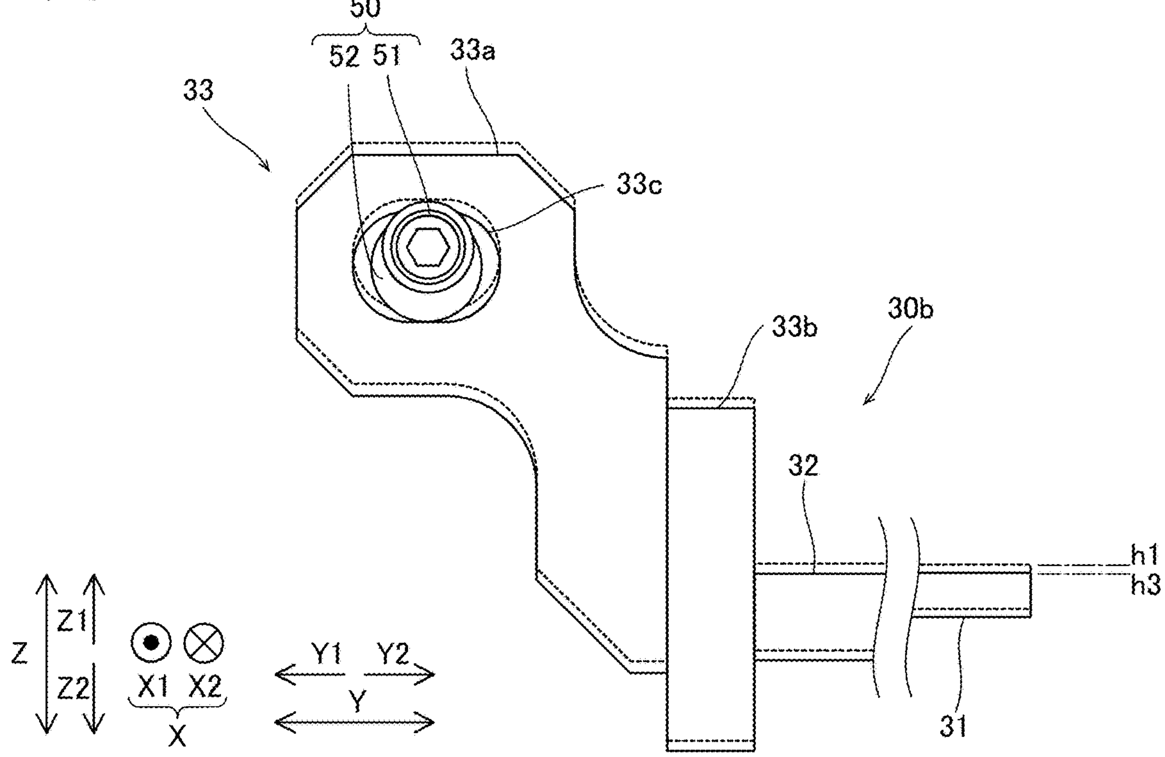
FIG. 8 is a view showing the blade whose height position is adjusted downward by fine adjustment.

As shown in FIG. 5, the hole 33*c* of the second blade 30*b* has an ellipse shape. The height position of the second blade 30*b* is set h1 by rotating the eccentric bolt 50 so as to protrude the flange 52 in the Y1 direction. As shown in FIG. 7, the height position of the second blade 30*b* is set h2 higher than h1 by rotating the eccentric bolt 50 so as to protrude the flange 52 in the Z1 direction. As shown in FIG. 8, the height position of the second blade 30*b* is set h3 lower than h1 by rotating the eccentric bolt 50 so as to protrude the flange 52 in the Z2 direction. The height position of the second blade 30*b* is steplessly adjusted between h2 and h3 by rotating the eccentric bolt 50.

Figure 9:
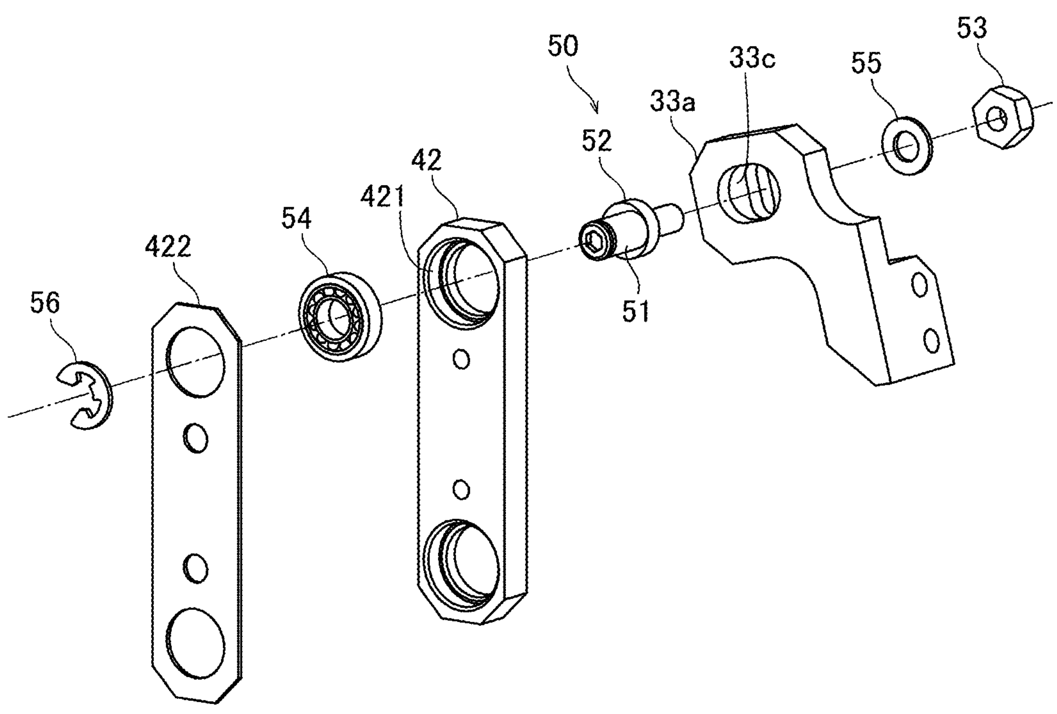
FIG. 9 is a view showing connection between the connection part of the blade and a second link.

In the first embodiment, a nut 53 is threadedly engaged with one end part of the eccentric bolt 50 as shown in FIG. 9. The eccentric bolt 50 serves both as an element for fine adjustment of the height position of the second blade 30*b* in an upward/downward direction, and an element for fastening the second blade 30*b* to the second link 42. Specifically, a hole 421 is arranged in the second link 42. A ring-shaped bearing 54 is arranged in the hole 421. The second link 42 includes a cover 422 covering the bearing 54. The shaft 51 of the eccentric bolt 50 passes through the hole 421 of the second link 42, the bearing 54 and the hole 33*c* of the second blade 30*b*. The shaft 51 of the eccentric bolt 50 is supported by the bearing 54. The flange 52 of the eccentric bolt 50 is arranged in the hole 33*c* of the first connection part 33*a* of the second blade 30*b*. The second blade 30*b* is fastened to the second link 42 by threadedly engaging the nut 53 with the one end part of the eccentric bolt 50, which passes through the hole 33*c* of the first connection part 33*a*. A washer 55 is arranged on the one end part of the eccentric bolt 50. A snap ring 56 is fitted onto another end of the eccentric bolt 50.

Advantages of First Embodiment

The biaser 70 is arranged separately from the driver 60, which drives the linkage 40, to apply a force to the linkage 40 in a direction that increases the pitch p between the blades 30 increases. Accordingly, because the biaser 70 applies a force to the linkage 40 in the direction that increases the pitch p between the blades 30, it is possible to keep the pitch p between blades 30 even when a driving force is not applied to the blades 30 for holding substrates W.

The biaser 70 biases the linkage 40 in the direction that increases the pitch p between the blades 30. Accordingly, the linkage 40 can be easily biased by a biasing force of the biaser 70 in the direction that increases the pitch p between the blades 30.

The pitch p between the blades 30 is changed by the driver 60 with a biasing force being applied against own weights of the blades 30 by the biaser 70. Accordingly, because the biasing force is applied against the own weights of the blades 30 by the biaser 70, the pitch p between the blades 30 can be changed by a driving force of a relatively small driver as the driver 60.

Balance is achieved between a force that is applied by the biaser 70 and the own weights of the plurality of blades 30 without a driving force of the driver 60. Accordingly, because balance is achieved between the own weights of the plurality of blades 30 and a force that is applied by the biaser 70, it is possible to easily keep the pitch p between blades 30 even when a driving force is not applied to the blades 30 for holding substrates W.

The biaser 70 is connected to the first link 41 and the third link 43. Accordingly, it is possible to prevent rotation of the first link 41 and the third link 43 in a direction that reduces the pitch p between the blades 30 by using the biaser 70 even without a driving force of the driver 60.

The biaser 70 includes a pulling coil spring that applies a pulling force to the first link 41 to rotate the first link in the direction that increases the pitch p between the blades 30. Accordingly, because the pitch p between blades 30 can be kept by a pulling coil spring having a relatively simple configuration, it is possible to simplify the configuration of the substrate-holding hand 20.

The blades 30 include the first blade 30*a* provided to the first substrate-holding hand 21 and fixed to the first substrate-holding hand 21, and a plurality of second blades 30*b* provided to the second substrate-holding hand 22 for changing the pitch p between the blades 30 through the linkage 40. Accordingly, it is possible to keep the pitch p between the second blades 30*b* by using the linkage 40 even when a driving force is not applied to the second blades 30*b*. Consequently, it is possible to also keep the pitch p between the second blade 30*b* and the first blade 30*a*.

Second Embodiment

Figure 10:
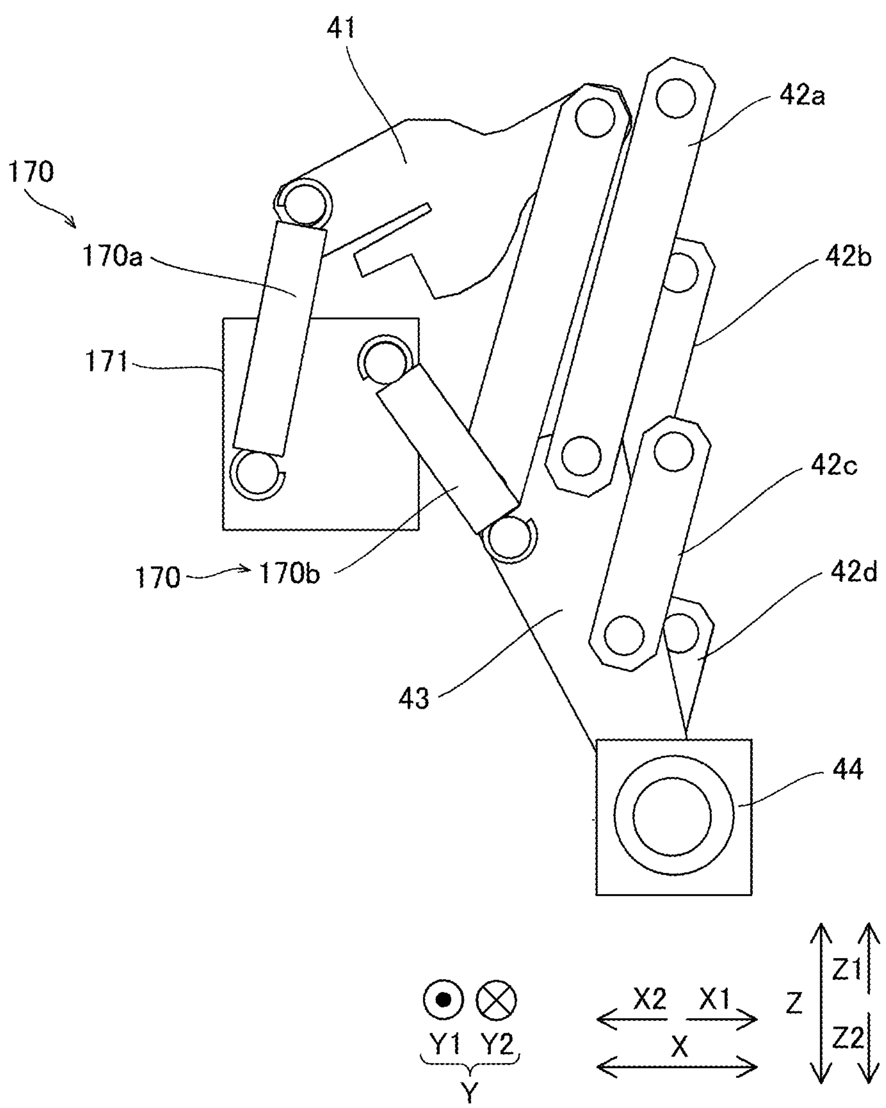
FIG. 10 is a view showing biasers according to a second embodiment.

The following description describes a configuration of a biaser 170 according to a second embodiment. As shown in FIG. 10, the biaser 170 includes a pair of biasers 170*a* and 170*b*. The biaser 170*a* is connected to the first link 41 and a support 171. The biaser 170*b* is connected to the third link 43 and the support 171. The support 171 is an element fixed to the second substrate-holding hand 22. The biaser 170*a* and the biaser 170*b* are pulling coil springs that apply pulling forces to the first link 41 and the third link 43 to rotate the first link and the third link, respectively, in the direction that increases the pitch p between the blades 30. Because two biasers, which are the biaser 170*a* and the biaser 170*b*, are provided, it is possible to reduce extension amounts and spring forces required of the biaser 170*a* and the biaser 170*b*. The biaser 170 is an example of a force applier. The biaser 170*a* and the biaser 170*b* are an example of a first applier and an example of a second force applier, respectively.

Modified Embodiments

Note that the embodiment disclosed this time must be considered as illustrative in all points and not restrictive. The scope of the present disclosure is not shown by the above description of the embodiments but by the scope of claims for patent, and all modifications (modified embodiments) within the meaning and scope equivalent to the scope of claims for patent are further included.

While the example in which four blades are provided as the second blades 30*b* has been shown in the aforementioned first and second embodiments, the present disclosure is not limited to this. The number of the second blade 30*b* can be anything number other than four.

While the example in which the linkage 40 includes the first link 41, the second link 42 and the third link 43 has been shown in the aforementioned first embodiment, the present invention is not limited to this. The number of types of links, and a shape of the linkage are not limited to the configuration of the linkage 40 according to the aforementioned first embodiment.

Figure 11:
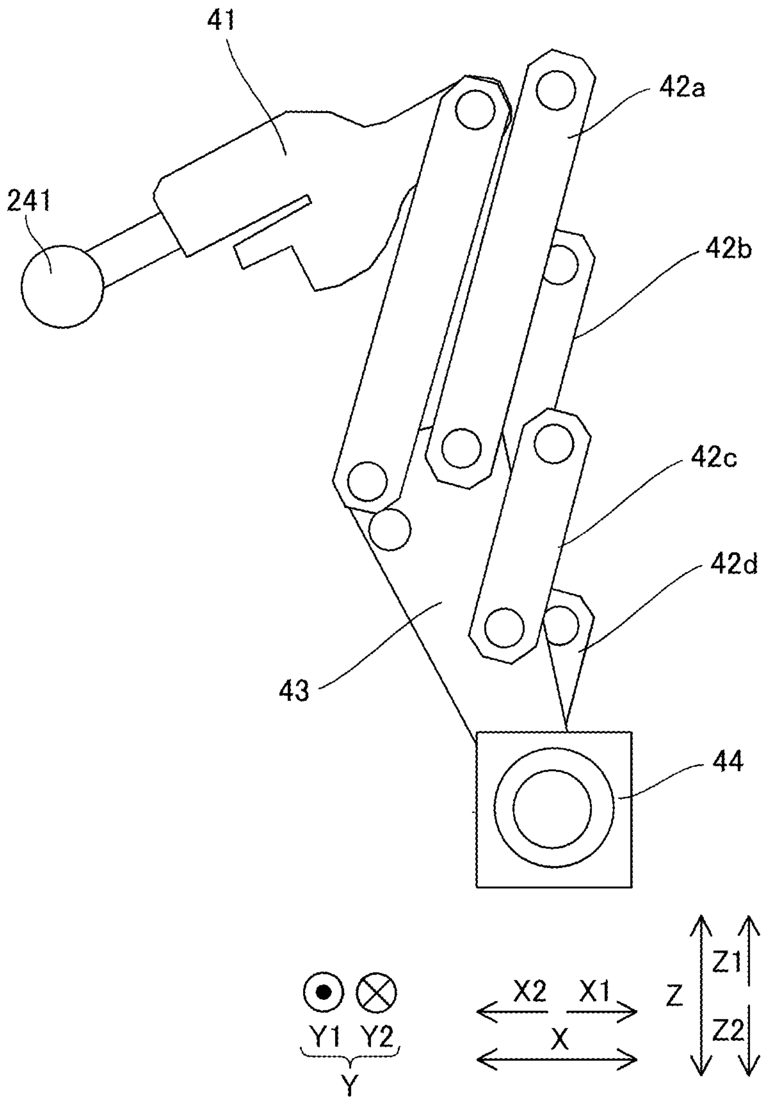
FIG. 11 is a view showing a weight according to a first modified embodiment.

While the example in which the biasers 70 and 170, which are pulling coil springs, are used as a force applier that biases the linkage 40 in a direction that increases the pitch p between the blades 30 has been shown in the aforementioned first and second embodiments, the present invention is not limited to this. For example, as in a first modified embodiment shown in FIG. 11, a weight 241 may be provided to the first link 41 to rotate the first link 41 in a direction that increases the pitch p between the blades 30. The weight 241 is an example of the force applier. The weight 241 can apply a force to the first link 41 to rotate the first link in the direction that increases the pitch p between the blades 30.

Figure 12:
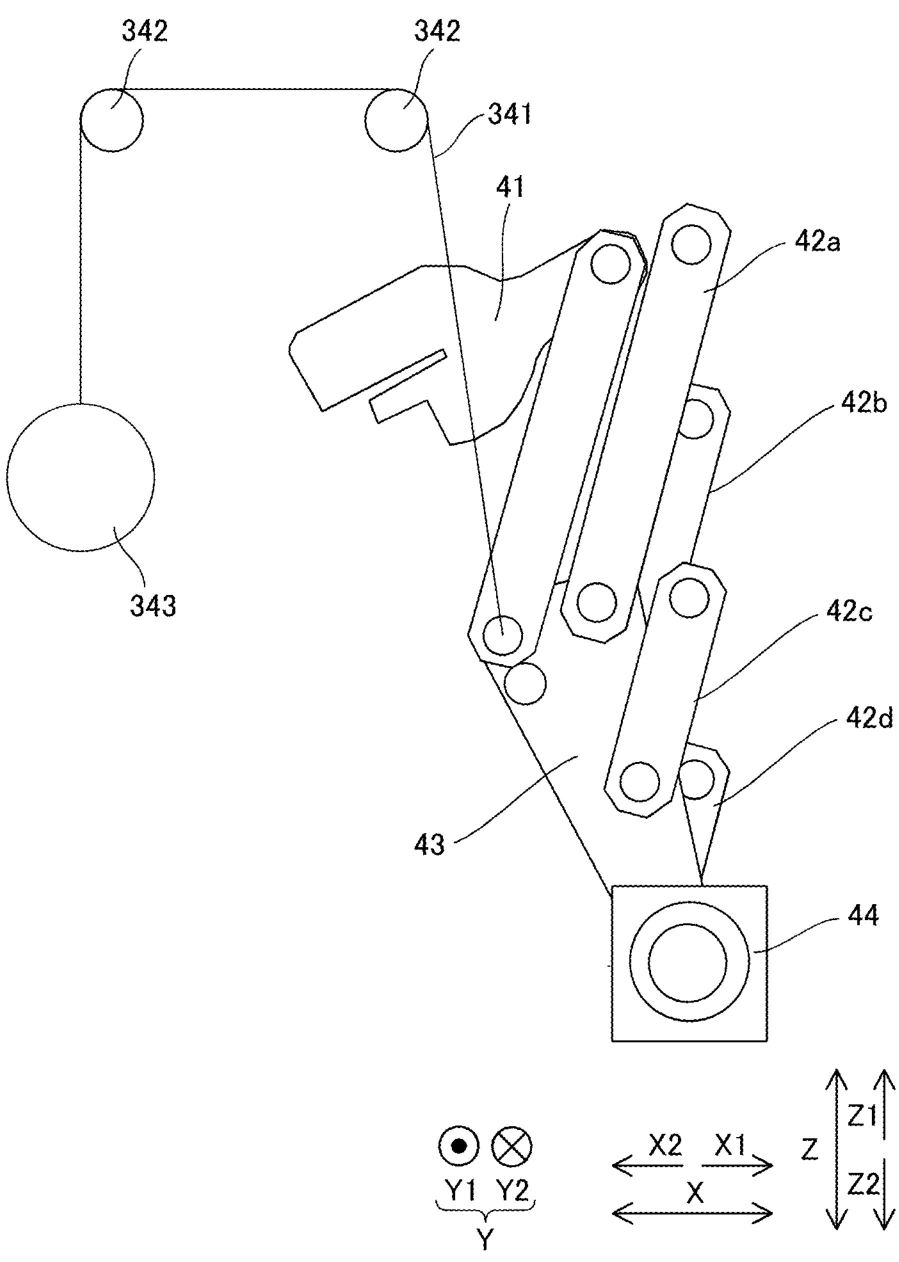
FIG. 12 is a view showing a weight according to a second modified embodiment.

Also, as in a second modified embodiment shown in FIG. 12, a weight 343 may be connected to the third link 43 through a wire 341 and pulleys 342 to rotate the third link 43 in a direction that increases the pitch p between the blades 30. The weight 343 is an example of the force applier. The weight 343 can apply a force to the first link 41 to rotate the first link in the direction that increases the pitch p between the blades 30.

While the example in which the substrate-holding hand 20 includes the first substrate-holding hand 21 and the second substrate-holding hand 22 has been shown in the aforementioned first and second embodiments, the present invention is not limited to this. For example, the present disclosure can be applied to a substrate-holding hand that does not include the first substrate-holding hand 21.

Modes

The aforementioned exemplary embodiment will be understood as concrete examples of the following modes by those skilled in the art.

Mode Item 1

A substrate-holding hand includes a plurality of blades for supporting substrates and stacked with the plurality of blades being spaced away from each other; a linkage for supporting the plurality of blades to change a pitch between the blades; and a force applier arranged separately from a driver for driving the linkage for applying a force to the linkage in a direction that increases the pitch between the blades.

Mode Item 2

In the substrate-holding hand according to mode item 1, the force applier includes a biaser for biasing the linkage in the direction that increases the pitch between the blades.

Mode Item 3

In the substrate-holding hand according to mode item 1 or 2, the driver for driving the linkage is further provided; and the driver changes the pitch between the blades with the biasing force being applied against own weights of the plurality of blades by the force applier.

Mode Item 4

In the substrate-holding hand according to mode item 3, balance is achieved between the force that is applied by the force applier and the own weights of the plurality of blades without a driving force of the driver.

Mode Item 5

In the substrate-holding hand according to mode item 3 or 4, the linkage includes a first link connected to the driver, a plurality of second links connected to the plurality of blades, and a third link connecting the plurality of second links to each other; and the force applier is connected to the first link and the third link.

Mode Item 6

In the substrate-holding hand according to mode item 3 or 4, the linkage includes a first link connected to the driver, a plurality of second links connected to the plurality of blades, and a third link connecting the plurality of second links to each other; a support fixed to the substrate-holding hand is further provided; and the force applier includes a first force applier connected to the first link and the support, and a second force applier connected to the third link and the support.

Mode Item 7

In the substrate-holding hand according to mode item 5 or 6, the force applier includes a pulling coil spring for applying a pulling force that rotates the first link in a direction that increases the pitch between the blades.

Mode Item 8

In the substrate-holding hand according to mode item 3 or 4, the linkage includes a first link connected to the driver, a plurality of second links connected to the plurality of blades, and a third link connecting the plurality of second links to each other; and the force applier includes a weight arranged on the first link.

Mode Item 9

In the substrate-holding hand according to mode item 3 or 4, the linkage includes a first link connected to the driver, a plurality of second links connected to the plurality of blades, and a third link connecting the plurality of second links to each other; and the force applier includes a weight connected to the third link through a wire and a pulley.

Mode Item 10

In the substrate-holding hand according to any of mode items 1 to 9, a first substrate-holding hand, and a second substrate-holding hand arranged on or above the first substrate-holding hand for operating independently of the first substrate-holding hand are further provided; and the blades include a first blade provided to the first substrate-holding hand and fixed to the first substrate-holding hand, and a plurality of second blades provided to the second substrate-holding hand for changing the pitch between the blades through the linkage.

Mode Item 11

A substrate-conveying robot includes a robot arm; and a substrate-holding hand arranged in a distal end part of the robot arm, wherein the substrate-holding hand includes a plurality of blades for supporting substrates and stacked with the plurality of blades being spaced away from each other, a linkage for supporting the plurality of blades to change a pitch between the blades, and a force applier arranged separately from a driver for driving the linkage for applying a force to the linkage in a direction that increases the pitch between the blades.

The invention claimed is:

1. A substrate-holding hand comprising:

a plurality of blades for supporting substrates and stacked with the plurality of blades being spaced away from each other;

a linkage for supporting the plurality of blades to change a pitch between the blades, the linkage including a first link, a plurality of second links and a third link, the third link being directly connected to the first link and the second links;

a driver configured to drive the linkage; and a force applier separate from the driver, the force applier including a including a biaser configured to apply a biasing force between the first link and the third link in a direction that increases the pitch between the blades and that acts against weights of the blades, wherein the driver is configured to change the pitch between the blades with the biasing force being applied, and the force that is applied by the biaser is balanced against the weights of the blades without a driving force of the driver being applied.

2. The substrate-holding hand according to claim 1, wherein the first link is connected to the driver, the plurality of second links are connected to the plurality of blades, the third link connects the plurality of second links to each other, and the force applier is connected to the first link and the third link.

3. The substrate-holding hand according to claim 2, wherein the force applier includes a pulling coil spring for applying a pulling force that rotates the first link in a direction that increases the pitch between the blades.

4. The substrate-holding hand according to claim 1, wherein the first link is connected to the driver, the plurality of second links are connected to the plurality of blades, the third link connects the plurality of second links to each other the substrate-holding hand further comprises a support fixed to the substrate-holding hand, and the force applier includes a first force applier connected to the first link and the support, and a second force applier connected to the third link and the support.

5. The substrate-holding hand according to claim 1, wherein the first link is connected to the driver, the plurality of second links are connected to the plurality of blades, the third link connects the plurality of second links to each other, and the force applier includes a weight on the first link.

6. The substrate-holding hand according to claim 1, wherein the first link is connected to the driver, the plurality of second links are connected to the plurality of blades, the third link connects the plurality of second links to each other, and the force applier includes a weight connected to the third link through a wire and a pulley.

7. The substrate-holding hand according to claim 1 comprising a first substrate-holding hand, and a second substrate-holding hand on or above the first substrate-holding hand and configured to operate independently of the first substrate-holding hand, wherein the blades include a first blade included in the first substrate-holding hand and fixed to the first substrate-holding hand, and a plurality of second blades included in the second substrate-holding hand and configured to change the pitch between the blades through the linkage.

8. A substrate-conveying robot comprising:

a robot arm; and a substrate-holding hand arranged in a distal end part of the robot arm, wherein the substrate-holding hand includes a plurality of blades for supporting substrates and stacked with the plurality of blades being spaced away from each other, a linkage for supporting the plurality of blades to change a pitch between the blades, the linkage including a first link, a plurality of second links and a third link, the third link being directly connected to the first link and the second links, a driver configured to drive the linkage, and a force applier separate from the driver, the force applier including a including a biaser configured to apply a biasing force between the first link and the third link in a direction that increases the pitch between the blades and that acts against weights of the blades, wherein the driver is configured to change the pitch between the blades with the biasing force being applied, and the force that is applied by the biaser is balanced against the weights of the blades without a driving force of the driver being applied.

* * * * *